United States Patent
Arsovski et al.

(10) Patent No.: US 7,483,806 B1
(45) Date of Patent: Jan. 27, 2009

(54) DESIGN STRUCTURES, METHOD AND SYSTEMS OF POWERING ON INTEGRATED CIRCUIT

(75) Inventors: Igor Arsovski, Williston, VT (US); Anthony R. Bonaccio, Shelburne, VT (US); Serafino Bueti, Waterbury, VT (US); Hayden C. Cranford, Jr., Cary, NC (US); Joseph A. Iadanza, Hinesburg, VT (US); Todd E. Leonard, Williston, VT (US); Hemen R. Shah, South Burlington, VT (US); Pradeep Thiagarajan, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/866,537

(22) Filed: Oct. 3, 2007

Related U.S. Application Data (63) Continuation-in-part of application No. 11/780,530, filed on Jul. 20, 2007.

(51) Int. Cl.
*G06F 15/00* (2006.01)
*G06F 11/00* (2006.01)

(52) U.S. Cl. .................. 702/132; 702/130; 702/131; 702/188; 324/765

(58) Field of Classification Search .................. 702/50, 702/99, 127–132, 136, 185, 180, 188, 189, 702/193, 100; 324/765
See application file for complete search history.

(56) References Cited

U.S. PATENT DOCUMENTS

| 6,957,163 | B2 * | 10/2005 | Ando .................. 702/130 |
| 6,960,744 | B2 | 11/2005 | Adkisson et al. |
| 6,975,047 | B2 | 12/2005 | Pippin |
| 7,151,390 | B2 | 12/2006 | Nguyen et al. |

* cited by examiner

*Primary Examiner*—Eliseo Ramos-Feliciano
*Assistant Examiner*—Phuong Huynh
(74) *Attorney, Agent, or Firm*—W. Riyon Harding; Hoffman Warnick LLC (57) ABSTRACT

Design structures, method and systems of powering on an integrated circuit (IC) are disclosed. In one embodiment, the system includes a region in the IC including functional logic, a temperature sensor for sensing a temperature in the region when the IC is powered up and a heating element therefor; a processing unit including: a comparator for comparing the temperature against a predetermined temperature value, a controller, which in the case that the temperature is below the predetermined temperature value, delays functional operation of the IC and controls heating of the region of the IC, and a monitor for monitoring the temperature in the region; and wherein the controller, in the case that the temperature rises above the predetermined temperature value, ceases the heating and initiates functional operation of the IC.

16 Claims, 6 Drawing Sheets

DESIGN STRUCTURES, METHOD AND SYSTEMS OF POWERING ON INTEGRATED CIRCUIT

This application is a continuation-in-part application of U.S. Ser. No. 11/780,530, filed Jul. 20, 2007, currently pending.

BACKGROUND

1. Technical Field

The disclosure relates generally to integrated circuits (ICs), and more particularly, to design structures, method and systems of powering on an integrated circuit (IC).

2. Background Art

Use of integrated circuits (IC) is ubiquitous. While the potential markets for products derived from a semiconductor technology have increased, so have the costs associated with bringing a semiconductor circuit family and/or IC to market. Use of today's IC technologies in such a diverse product set has forced an increase in operational temperature range from 0° C. to 100° C. in prior technologies to a wider temperature range from −55° C. to 125° C. in present technologies. For a typical present generation semiconductor technology, this temperature envelope expansion results in a change in the temperature-driven threshold voltage (Vt) variance of transistors from less than 70 millivolts to greater than 125 millivolts. The increase in Vt variance coupled with the scaling of supply voltage at a greater rate than Vt in succeeding technologies may result in circuits with functionality problems or poor performance characteristics over one or more process/voltage/temperature extremes. Traditionally, in the circuit design process, these functionality and performance problems result in substantial increases in design time, cost and risk and may add weeks to months to the design cycle for complex circuit functions.

Furthermore, the cost of supporting a wide temperature range does not stop at circuit design level, but continues to add cost and schedule delay in the design of the ICs which utilize the circuits. Here, support for a wide temperature range puts pressure on timing closure of critical paths within the IC, forcing iterative synthesis/optimization, circuit placement and routing. Colder temperatures speed semiconductor performance which stresses hold time specifications in which the time data must remain valid after a clock edge has locked the data into a sequential latch element. Chip-level designers are required to correct hold-time problems by adding additional buffering delays in the logic path to slow the data arrival at the sequential element. While necessary to prevent early-mode timing problems, these buffers consume space and power, and in some instances, cause timing problems during closure under worst case process/voltage/temperature conditions. In many cases resolving chip-level timing issues caused by increases in the temperature envelope may result in a final IC that operates at higher power and is larger, and as a result more costly to manufacture than an IC without the requirement of a wide operational temperature range.

While the high side of the temperature range is often set by the anticipated power density of ICs manufactured in a technology and the thermal limitations of semiconductor packaging, the low side of the temperature range is most often set by the external environment temperature at the moment the IC is powered-on, which is outside the control of the circuit, IC or system designer.

SUMMARY

Design structures, method and systems of powering on an integrated circuit (IC) are disclosed. In one embodiment, the system includes a region in the IC including functional logic, a temperature sensor for sensing a temperature in the region when the IC is powered up and a heating element therefor; a processing unit including: a comparator for comparing the temperature against a predetermined temperature value, a controller, which in the case that the temperature is below the predetermined temperature value, delays functional operation of the IC and controls heating of the region of the IC, and a monitor for monitoring the temperature in the region; and wherein the controller, in the case that the temperature rises above the predetermined temperature value, ceases the heating and initiates functional operation of the IC.

A first aspect of the disclosure provides a method of powering on an integrated circuit (IC), the method comprising: sensing a temperature for a region of the IC when the IC is powered up; comparing the temperature against a predetermined temperature value; and in the case that the temperature is below the predetermined temperature value, delaying functional operation of the IC and heating the region of the IC.

A second aspect of the disclosure provides a system of powering on an integrated circuit (IC), the system comprising: a region in the IC including functional logic, a temperature sensor for sensing a temperature in the region when the IC is powered up and a heating element therefor; a processing unit including: a comparator for comparing the temperature against a predetermined temperature value, a controller, which in the case that the temperature is below the predetermined temperature value, delays functional operation of the IC and controls heating of the region of the IC, and a monitor for monitoring the temperature in the region; and wherein the controller, in the case that the temperature rises above the predetermined temperature value, ceases the heating and initiates functional operation of the IC.

A third aspect of the disclosure provides a system of powering on an integrated circuit (IC), the system comprising: a plurality of regions in the IC, each region including functional logic, a temperature sensor for sensing a temperature in the region when the IC is powered up and a heating element therefor; a processing unit including: a comparator for comparing the temperature of each region against a respective predetermined temperature value therefor, a controller, which in the case that the temperature is below the predetermined temperature value for at least one region, delays functional operation of the IC and controls heating of the at least one region of the IC, and a monitor for monitoring the temperature of each region that is below the predetermined temperature value; and wherein the controller, in the case that the temperature of each region rises above the predetermined temperature value therefor, ceases the heating and initiates functional operation of the IC.

A fourth aspect of the disclosure is directed to a design structure embodied in a machine readable medium for designing, manufacturing, or testing a design, the design structure comprising: a system of powering on an integrated circuit (IC), the system comprising: a region in the IC including functional logic, a temperature sensor for sensing a temperature in the region when the IC is powered up and a heating element therefor; a processing unit including: a comparator for comparing the temperature against a predetermined temperature value, a controller, which in the case that the temperature is below the predetermined temperature value, delays functional operation of the IC and controls heating of the region of the IC, and a monitor for monitoring the temperature in the region; and wherein the controller, in the case that the temperature rises above the predetermined temperature value, ceases the heating and initiates functional operation of the IC.

A fifth aspect of the disclosure is directed to a design structure embodied in a machine readable medium for designing, manufacturing, or testing a design, the design structure comprising: a system of powering on an integrated circuit (IC), the system comprising: a plurality of regions in the IC, each region including functional logic, a temperature sensor for sensing a temperature in the region when the IC is powered up and a heating element therefor; a processing unit including: a comparator for comparing the temperature of each region against a respective predetermined temperature value therefor, a controller, which in the case that the temperature is below the predetermined temperature value for at least one region, delays functional operation of the IC and controls heating of the at least one region of the IC, and a monitor for monitoring the temperature of each region that is below the predetermined temperature value; and wherein the controller, in the case that the temperature of each region rises above the predetermined temperature value therefor, ceases the heating and initiates functional operation of the IC.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

A method and systems of powering on an integrated circuit (IC) are disclosed. The systems and method limit the effective operational temperature range of the IC. In particular, temperature of one or more circuit regions (hereinafter simply "regions") is sensed and tested against a respective predetermined temperature value. As used herein, the "predetermined temperature value" indicates a minimum temperature at which a region is expected to operate properly. When the temperature is below the predetermined temperature value, a heating element is used to bring the temperature of the region and/or the IC to at least the predetermined temperature value. Because thermal monitoring and heating effectively raises the minimum operating temperature above the cold-start environmental condition, the effective temperature range over which the design must operate is effectively reduced. As a result, regions within an IC, with the exception of those which monitor temperature and/or control the heating element(s) may be designed to the tighter temperature range. The regions that monitor the temperature (or the temperature monitoring system) are designed in such a way as to avoid the problems associated with the wide temperature range. ICs which utilize this disclosure may be produced on a faster design cycle and can both be cheaper to produce and consume lower power than ICs which are designed to operate over the unmodified temperature range. As a result, both the manufacturing process and the resulting product are more environmentally friendly and energy efficient.

Figure 1:
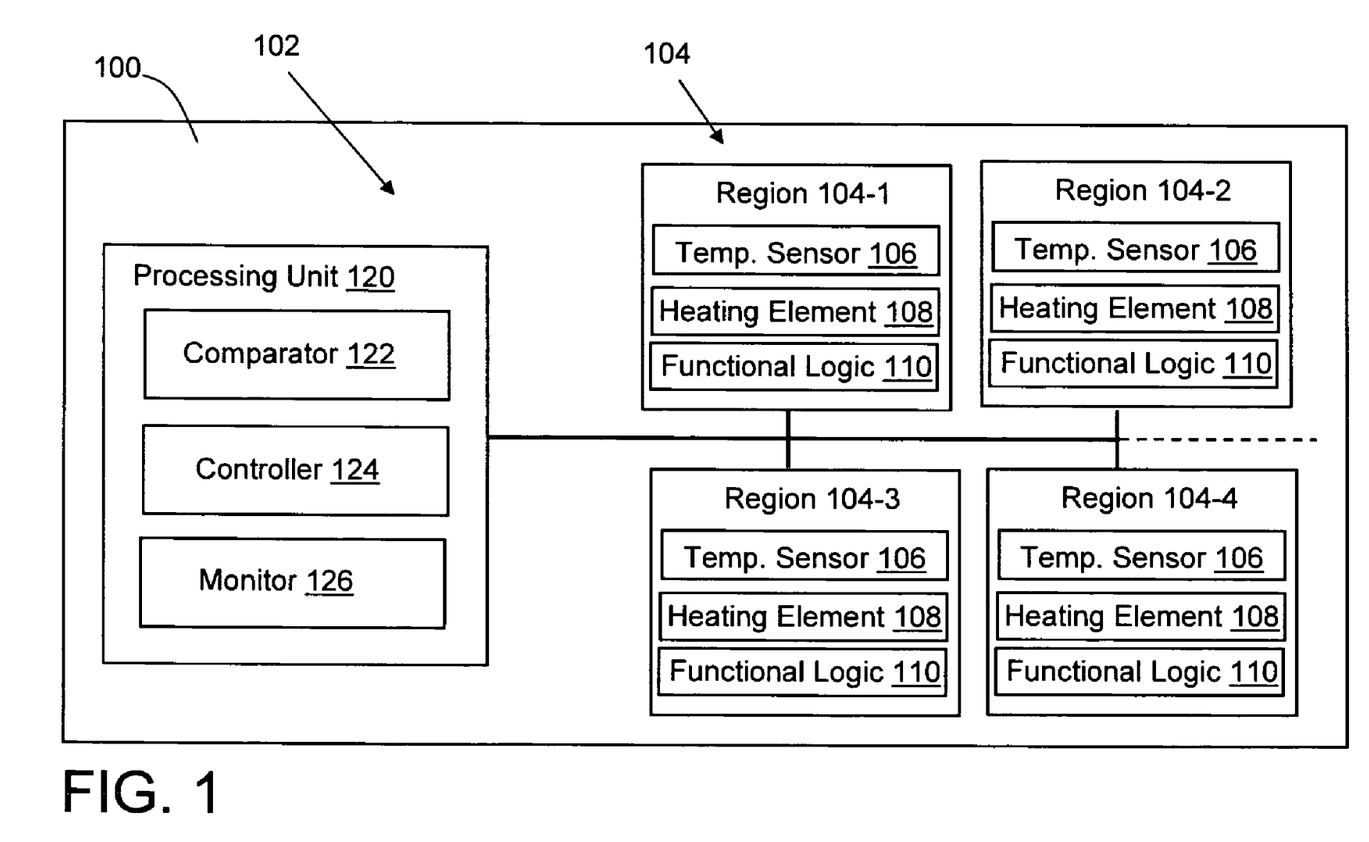
FIG. 1 shows one embodiment of a system for powering on an integrated circuit.

FIG. 1 shows one embodiment of a system 102 of powering on an IC 100 according to the disclosure. As understood, IC 100 includes a variety of other circuits not shown for clarity. System 102 includes one or more regions 104, only four (104-1-104-4) of which are shown. (Regions 104-1 to 104-4 may collectively or individually be referred to as region 104 or regions 104 when more precise reference is not necessary). Each region 104 includes a temperature sensor 106 for sensing a temperature in the respective region when the IC is powered up, a heating element 108 therefor and a functional logic 110. System 102 also includes a processing unit 120 including a comparator 122 for comparing the temperature of each region 104 against a respective predetermined temperature value; a controller 124; and a monitor 126 for monitoring the temperature in the region 104, i.e., monitoring temperature sensor(s) 106. As will be described in greater detail herein, controller 124 delays functional operation of IC 100 and controls heating of region(s) 104 of IC 100 in the case that the temperature for a region(s) 104 is below the respective predetermined temperature value. In addition, when the temperature rises above the predetermined temperature value, controller 124 ceases the heating and initiates functional operation of IC 100. Where more than one region 104 exists, the predetermined temperature values may be different for different regions 104.

Although shown as a single entity, IC 100 may exist at a system level with each region 104 representing an IC within the system, which itself may contain multiple regions. Regions 104 within a single IC 100 may be compartmentalized in any fashion desired by a user. When more than one region 104 exists, processing unit 120 is shared among and interacts with the multiple regions.

With regard to region(s) 104, functional logic 110 may include any form of circuitry found in an IC 100. Furthermore, temperature sensor 106 may include any now known or later developed sensor. For example, a temperature sensor 106 may include a single PN junction diode, a differential pair of PN junction diodes operated at differing current density, or a metal film resistor, any of which could be coupled to an analog-to-digital converter to provide a direct digital readout of the temperature. Although FIG. 1 illustrates a temperature sensor 106 tightly coupled to a region 104, in an alternative embodiment, temperature sensor 106 may be external to IC 100 to monitor the ambient temperature of the environment. In this embodiment, processing unit 120 or the predetermined temperature value may be modified to account for the state of each region 104 within system 102. For example, the predetermined temperature value may be selected to compensate for the location of temperature sensor 106. Factors taken into consideration in this case may include, for example, whether region 104 is static-off, static-on or transient power-up, the thermal resistance coefficients between each region 104 and the location within system 102 where temperature is measured.

Heating element 108 may take a number of forms. In one embodiment, heating element 108 may include resistor(s) placed throughout the respective region. In this case, when heating element 108 is enabled, current is driven through the resistor(s) with associated thermal heat dissipation. The resistor(s) may be surface resistors or buried resistors under active circuitry depending upon technology. In another embodiment, heating element 108 may include functional logic into which no-op instructions, pseudo-functional patterns or clock tree stimulation may be input to generate heat from operation. In this case, the heating element functional logic may be any combination of clock distribution, latches, combinational logic, arrays and/or analog/mixed signal macros. In the second embodiment, processing unit 120 would disable functional operation in any region 104 requiring heating prior to enabling the heating function. The patterns need not implement a logically correct function. All that is required is that node toggle coverage be sufficient to consume power and increase temperature in the target region. As an enhancement to the second embodiment, multiple regions 104 of identical function may be provided in system 102 such that while a first region, e.g., 104-1, is in a functional mode, at least one second region, e.g., 104-3, is kept at-temperature. (As used herein, "at-temperature" indicates a region is above it's respective predetermined temperature value). If first region 104-1 falls below a predetermined operating temperature, operation can switch to second domain 104-3 while the first region is restored to its respective predetermined minimum temperature.

Turning to FIGS. 2-5, various embodiments of methods of operation of system 102 will now be described in conjunction with FIG. 1. In FIGS. 2-5, for purposes of description, registers such as temp_in_range, all_regions_rdy, etc., may be set to '0' for a negative result, and '1' for an affirmative result. There are considered to be N regions on IC 100, numbering 0 to N–1. A region counter or identifier X keeps track of which of the N regions is under evaluation. Temp_in_range is an N bit register with each bit representing whether a region's temperature has met the predetermined temperature value therefor. Temp(X) is an N bit register that includes the temperature of a region. Low-temp_limit is an N bit register that includes the predetermined temperature value, i.e., minimum operating temperature, for a region to be powered on. All_regions_rdy indicates whether all regions have reached their respective predetermined temperature value. Op_temp_limit is an N bit vector that includes a minimum operational temperature for a region once the region is powered on, which may be equivalent to, or differ from low_temp_limit.

Figure 2:
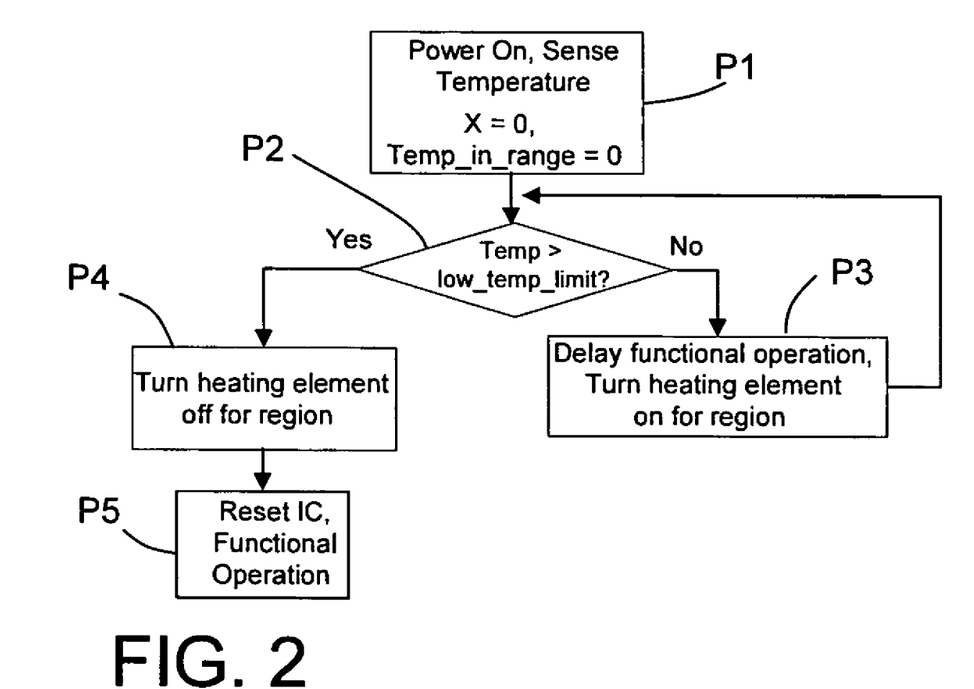
FIG. 2 shows a first embodiment of an operational methodology of the system of FIG. 1.

FIG. 2 shows a flow diagram of one embodiment of operational methodology of system 102 as it pertains to an IC 100 including one region 104. In process P1, temperature sensor 106 senses a temperature for region 104 of IC 100 when the IC is powered on. That is, when power-up of IC 100 is detected, processing unit 120 is reset including a temp_in_range register (=0), and heating element 108 therefor is disabled. For purposes of description, temp_in_range is set to '0' for a negative result, and '1' for an affirmative result.

In process P2, comparator 122 compares the temperature against a predetermined temperature value, low_temp_limit, for region 104. As indicated above, the predetermined temperature value is a minimum temperature at which region 104 is expected to operate properly. The predetermined temperature value may be hard coded for a particular circuit family or technology, may be selected to match the application for IC 100 or system 102 or may take on the greater of either the technology/family or application limit.

In process P3, in the case that the temperature is below the predetermined temperature value, i.e., NO at P2, controller 124 delays functional operation of the IC 100 and turns on heating element 108 for region 104, thus heating the region 104 of the IC. In this case, the temp_in_range register for the region under evaluation is set to 0. Processing then returns to process P2. That is, where the temperature is below the predetermined temperature value, i.e., NO at P2, monitor 126 monitors the temperature in region 104 of IC 100 as measured by temperature sensor 106, indicated by the loop back to process P2. Alternatively, in the case that that the temperature is above the predetermined temperature value, i.e., YES at P2, controller 124 ceases any heating and sets temp_in_range to 1. If the temperature of region 104 was previously found to be below the predetermined temperature value at P2 and heating unit 108 was turned on in process P3, then heating element 108 is turned off in process P4. If alternatively, the temperature of region 104 was found to be above the predetermined temperature value the first time process P2 is executed, heating unit 108 remains off in process P4. With process P4 complete, functional operation of IC 100 is initiated in process P5. Process P5 may also include a reset of IC 100.

Figure 3:
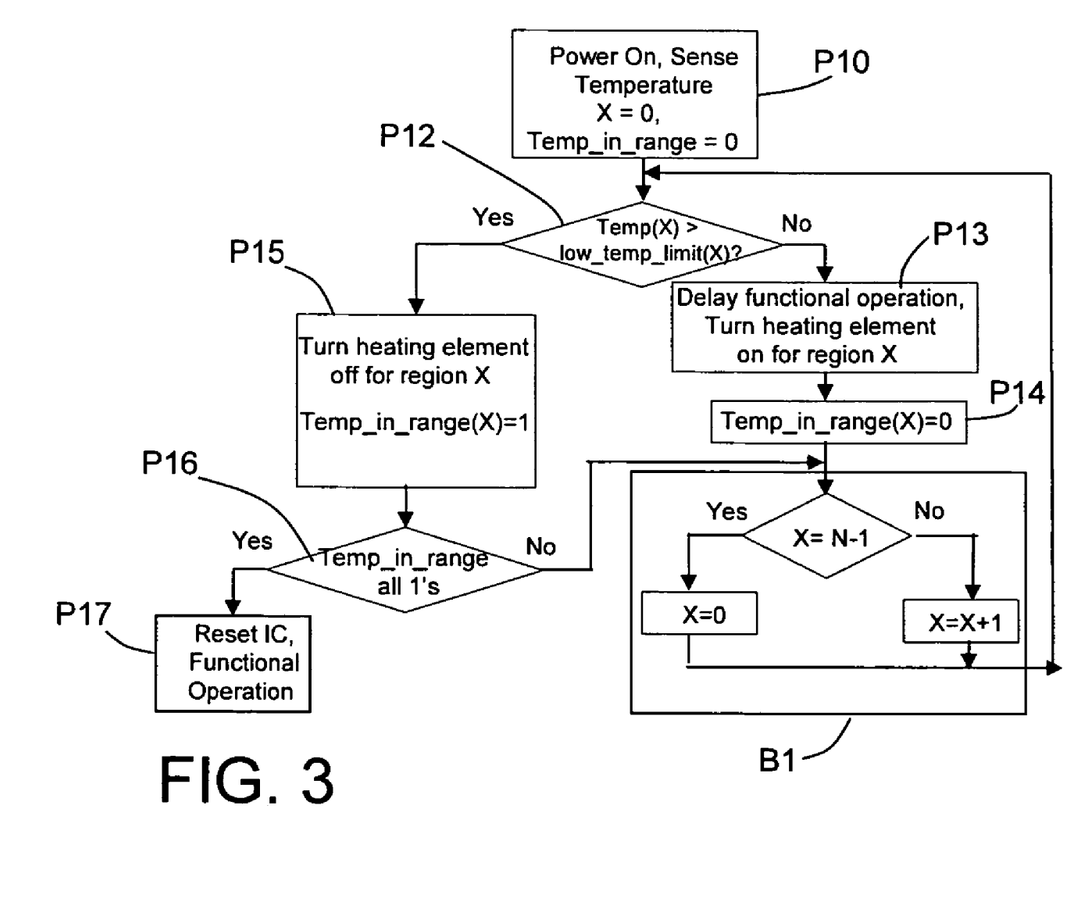
FIG. 3 shows a second embodiment of an operational methodology of the system of FIG. 1.

Turning to FIG. 3, an embodiment as it applies to IC 100 including multiple regions 104-1-104-4 (FIG. 1) is illustrated. In process P10, temperature sensor 106 (perhaps in conjunction with monitor 126) senses a temperature for a region 104-1 of IC 100 when the IC is powered up. That is, when power-up of IC 100 is detected, processing unit 120 is reset including a temp_in_range register which includes bits representing the temperature status of each region 104 (FIG. 1) in system 100, and all heating elements 108 are disabled. A region counter or identifier X is also set to 0 so processing may progress through different regions 104. For purposes of description, it will be assumed that the regions 104-1 to 104-4 will be evaluated in numerical order, i.e., 104-1, 104-2, 104-3, 104-4.

In process P12, comparator 122 compares the temperature (temp(x)), i.e., temperature for region 104-1, against a predetermined temperature value, low_temp_limit(x), for region 104-1. In this embodiment, where more than one region 104 exists, the temperature (temp(x)) and the predetermined temperature value therefor (low_temp_limit(x)) are region 104 specific. For example, it may be advantageous to set the predetermined temperature values for disparate regions 104 to different values. As an example, a region 104-3 containing non-critical digital logic may have its heating element 108 disabled when the temperature reaches –30° C., whereas a sensitive analog region 104-4 may have its heating element 108 disabled when the temperature reaches 0° C. and a high speed digital region 104-2 may have its heating element 108 disabled when the temperature reaches +5° C. In the most general cases, all regions 104 within IC 100 need not be temperature controlled. In a related embodiment, an IC 100 can be constructed where low-speed, non-critical regions 104 are not controlled with heating elements 108 as taught herein, while higher-speed and or critical regions 104 such as analog or processor functions are controlled using the teachings of the disclosure. As noted above, the predetermined temperature value may be hard coded for a particular circuit family or technology, may be selected to match the application for IC 100 or system 102 or may take on the greater of either the technology/family or application limit.

In process P13, in the case that the temperature is below the predetermined temperature value, i.e., NO at P12, for region 104-1 under evaluation, controller 124 delays functional operation of IC 100 and turns on heating element 108 for region 104-1, thus heating region 104-1. At P14, controller 124 sets the temp_in_range register to 0 for region 104-1, indicating it is not at the predetermined temperature value. Subsequently, any necessary stepping of region counter X is made in block B1.

Returning to process P12, in the case that that the temperature is above the predetermined temperature value, i.e., YES at P12, controller 124 sets the temp_in_range register to 1, and ceases heating by turning heating element 108 off (if it was on) at process P15. In processes P16, controller 124 determines whether each of the plurality of regions 104-1-104-4 is at a temperature above a predetermined temperature value therefor. If each region 104 is above its respective predetermined temperature value, i.e., YES at P16, then controller 124 initiates functional operation of the IC at process P17. Process P17 may also include a reset of IC 100. Otherwise, i.e., NO at P16, controller 124 returns processing to block B1 to step region counter X as necessary. Hence, in one embodiment, controller 124 may initiate functional operation of IC 100 only in the case that each of the plurality of regions 104 is at a temperature above the predetermined temperature value (low_temp_limit(x)) therefor.

While FIG. 3 illustrates polling of regions 104 sequentially, in an alternative embodiment, all regions 104 may be polled in parallel with processing unit 120 exiting to functional operation only when all regions 104 are above their respective predetermined temperature values and all heating elements 108 are disabled. Should a parallel embodiment be used, heating element 108 control for each region 104 remains independent.

Figure 4:
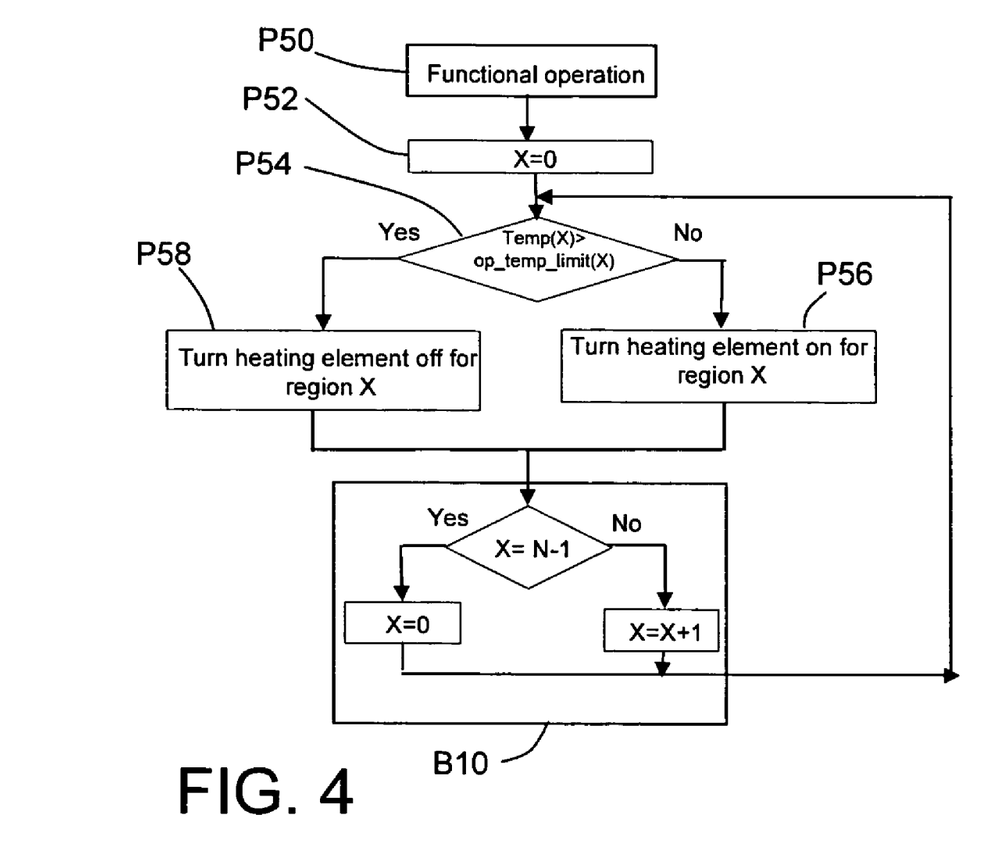
FIG. 4 shows an optional embodiment for operational methodology of the system of FIG. 1.

Turning to FIG. 4, in an optional alternative embodiment, once system 102 is in functional operation at process P50, monitor 126 (perhaps in conjunction with temperature sensor 106) may continue to monitor the temperature-readiness of system 102. (A region counter or identifier X may be reset at P52.) In this case, in process P54, monitor 126 monitors an operational temperature (temp(X)) of the region, e.g., region 104-1, after the initiating of functional operation of the IC at process P50. In the case that the operational temperature (temp(X)) is below a predetermined operational value (op_temp_limit(x)) for a respective region 104-1, i.e., NO at process P54, controller 124 controls heating of region 104-1, i.e., turns on heating element 108 for region 104-1 at process P56, until the operational temperature (temp(X)) rises above the predetermined operational value (op_temp_limit(x)). Each region 104 may have a different predetermined operational value, and the predetermined operational value may vary from the predetermined temperature value (described above). For example, the predetermined operational value may be skewed to be higher to allow for additional design margin and insure that region 104 is reheated before the operational temperature (temp(X)) falls to a value which may cause a functional failure of region 104.

As indicated by block B10, processing unit 120 steps region counter X as necessary and the rest of the processing cycles through each region 104 polling the temperature sensor 106 and comparing the returned value to the respective predetermined operational value. Should the operational temperature for any region 104 be below the predetermined operational value therefor, the respective heating element 108 for that region 104 is enabled at process P56. Once the region 104 returns to operational temperature compliance, the heating element 108 is disabled at process P58. Should heating element 108 be constructed as a discrete heater using resistors or other elements exclusive of functional logic 110, functional operation of region 104 may continue while heating element 108 is enabled. When heating element 108 is implemented using functional logic 110, region 104 may be disabled and functional operation transferred to a region 104 of IC 100 which remains above the predetermined operational value. Once the region 104 returns to operational temperature compliance, it may be re-enabled for functional operation. Alternatively, controller 124 may submit additional no-op or pseudo-functional workload on region 104 at a lower priority to consume available processing cycles while preserving the functional readiness of region 104. For example, for a floating point arithmetic unit region 104, additional floating point instructions may be executed when region 104 is not required for functional operation of IC 100. While FIG. 4 illustrates polling of regions 104 in a sequential manner, in an alternative embodiment, regions 104 may be polled in parallel while heating element 108 control for each region 104 remains independent.

Figure 5:
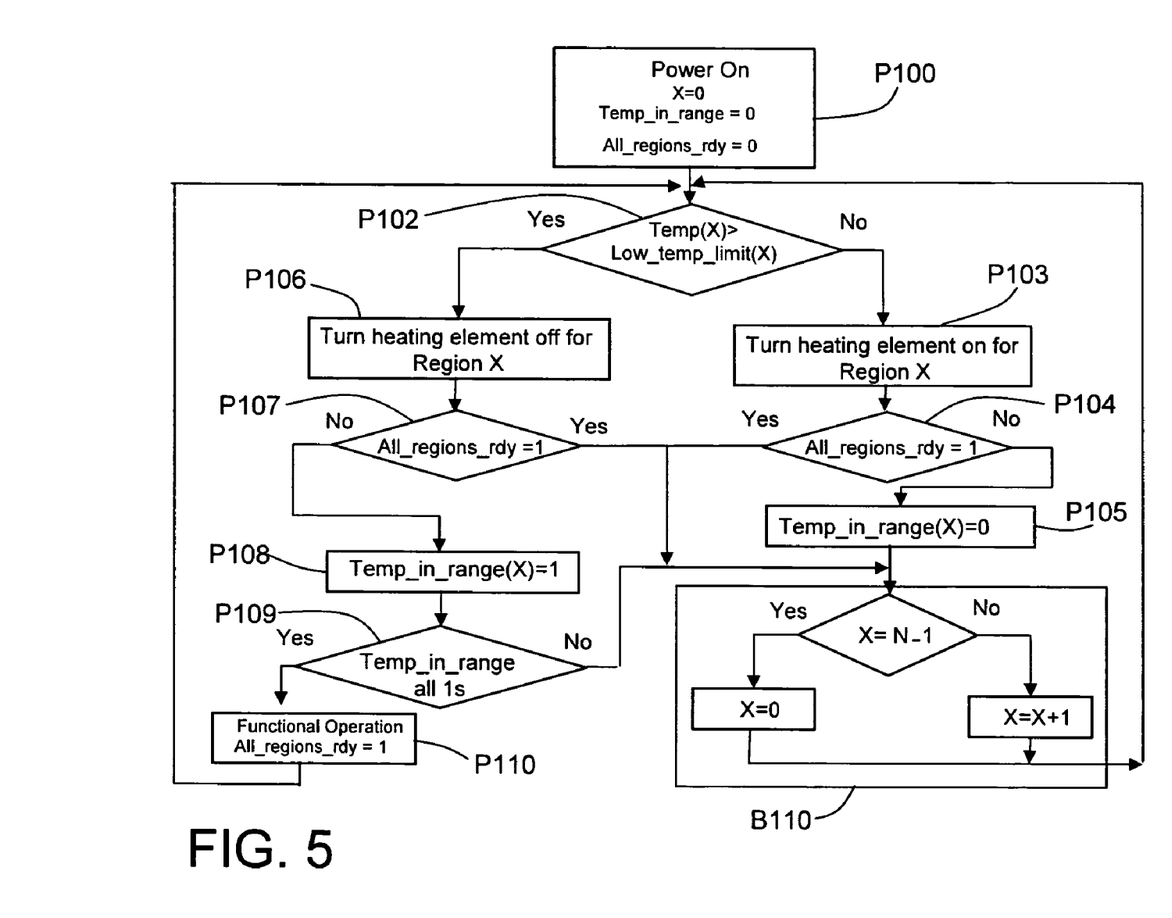
FIG. 5 shows a third embodiment of an operational methodology of the system of FIG. 1.

Referring to FIG. 5, a flow diagram that combines the functions of FIGS. 3 and 4 is illustrated. At power-on at process P100, processing unit 120 and the status registers (region counter X, temp_in_range, and all_regions_rdy) are reset (i.e., to 0). As noted above, temp_in_range status includes bits for each region which are set (1) when the temperature (temp(X)) is found to be above the predetermined temperature value (low_temp_limit(X)) and reset (0) when the temperature is found to be below the predetermined temperature value. Further, the all_regions_rdy status provides an indication of whether system 102 has gone through initial power-up temperature checks and been released to functional operation.

In the next process P102, temperature sensor 106 for a region 104-1 is polled and checked against a predetermined temperature value therefor. The predetermined temperature value may be a single value or may be dependent on the state of the all_regions_rdy status so as to differentiate temperature constraints between initial power-up and functional operation monitoring. Where the temperature is below the predetermined temperature value, i.e., NO at P102, at process P103, heating element 108 for region 104-1 is enabled to heat the region. At process P104, if the all_regions_rdy status is set (1) indicating that system 102 has already gone through power-on temperature adjustment and system reset, i.e., YES at P104, processing continues polling the next region 104-2 in system 102 as part of system monitoring during functional operation (via block B110 and the loop back to process P102). If temperature adjustment was not completed yet, i.e., NO at P104, then the all_regions_rdy status will be in reset to 0, in which case, the temp_in_range register for the present region 104-1 is reset to 0 at process P105 to indicate that the temperature (temp(X)) is below the predetermined temperature value for region 104-2. Processing then advances to polling the next region 104-2 via block B110 and the loop back to process P102.

Returning to process P102, if the temperature (temp(X)) is at or above the predetermined temperature value, i.e., YES at P102, heating element 108 for region 104-2 associated with the polled temperature sensor 106 is disabled at process P106 if it was turned on earlier in process P103, so as not to overheat the region. In process P107, all_regions_rdy status is polled. If the all_regions_rdy is affirmative (1), i.e., YES at process P107, system 102 has already entered functional operation and processing advances to polling the next region 104-3 (via block B110 and the loop back to process P102), continuously cycling through all regions in system 102. In contrast, if the all_regions_rdy is negative (0), the temp_in-_range register for the present region 104-2 is set to 1 at process P108 to indicate the region is at-temperature.

At process P109, the temp_in_range register is polled in total to determine if all regions 104 are at-temperature. If all regions are not at-temperature, i.e, NO at P109, then processing continues to cyclically advance and test region temperatures, enabling and disabling heating elements 108 as necessary. If all regions are at-temperature, i.e., YES at P109, system 102 is determined to be at-temperature, and the all_regions_rdy status is set to 1 at process P110 to indicate initial at-temperature achievement and system 102 is released to functional operation (may include reset). Setting of the all_regions_rdy status to affirmative (1) at process P110 prevents controller 124 from sending system 102 into reset each time a heating cycle occurs in functional operation. While FIG. 5 illustrates polling regions 104 sequentially, an alternative embodiment may poll all regions in parallel while maintaining independent control of heater elements 108 for each region 104 as well as temp_in_range status register for each region 104.

In some circumstances, the above-described processes may not attain the predetermined temperature value for each region 104. In this case, additional processing may be provided in order to reach the predetermined temperature value. In general, in the case that one or more particular regions, e.g., 104-4, does not attain the predetermined temperature value after a set number of attempts, controller 124 controls heating of a proximate region, e.g., one or more regions 104-1, 104-2, 104-3, that is in close proximity to the particular region 104-4 that was not previously heated. The particular condition that triggers heating using proximate regions may vary. For example, it may be based on a number of regions 104 not being at-temperature. The enablement of heating elements 108 for proximate regions 104-1, 104-2, 104-3 may be in a predetermined sequence. If the particular region 104-4 does not attain the predetermined temperature value after heating the proximate region 104-1, 104-2, 104-3, controller 124 increases the predetermined temperature value for proximate region 104-1, 104-2, 104-3 and repeats the heating of the proximate region. In one embodiment, the increasing of the predetermined temperature value may be in a stepped fashion, e.g., by 5° C. increments, and may vary depending on the region 104. The additional processing is intended to minimize the overall power consumption of IC 100 while achieving the predetermined temperature value for all the defined regions 104. Finally, if external heaters are provisioned (not shown), like surface resistors, the thermal heat dissipation can be increased to ensure meeting of the predetermined temperature values for each region 104, e.g., by turning on or adding more resistors, changing resistors values, etc.

In a modification to the embodiment of FIG. 5, the temp_in_range or similar register may be used to track the temperature status of regions 104 after all_regions_ready is set to 1. If system 102 uses a pseudo-functional pattern operation of functional operation 110 to achieve the predetermined temperature, the register may be used to place IC 100 in a standby mode or restrict function of IC 100 to exclude region(s) 104 that are under temperature from functional operation until their temperature is restored. If heating element(s) 108 do not require disabling operation of functional logic 110, IC 100 may continue to operate should region(s) 104 fall below their op_temp_limit as long as the op_temp_limit has sufficient margin to the low_temp_unit to prevent region(s) 104 from falling below a circuit or application limit.

Figure 6:
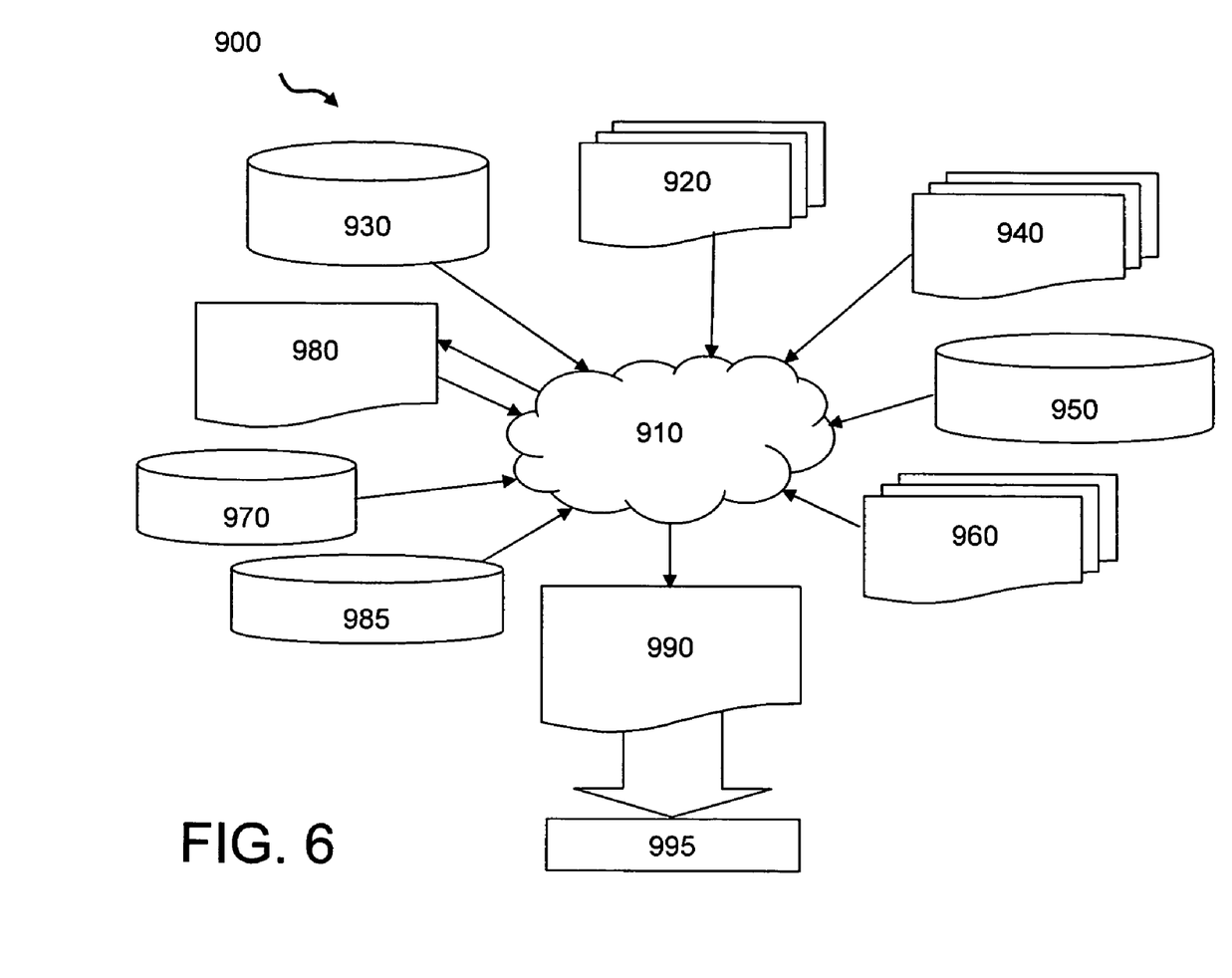
FIG. 6 shows a block diagram of an example design flow according to the disclosure.

FIG. 6 shows a block diagram of an example design flow 900. Design flow 900 may vary depending on the type of IC 100 being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises IC 100 in the form of schematics or HDL, a hardware-description language (e.g., Verilog, VHDL, C, etc.). Design structure 920 may be contained on one or more machine readable medium. For example, design structure 920 may be a text file or a graphical representation of IC 100. Design process 910 preferably synthesizes (or translates) IC 100 into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the disclosure. The design structure of the disclosure is not limited to any specific design flow.

Design process 910 preferably translates an embodiment of the disclosure as shown in FIG. 1, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the disclosure as shown in FIG. 1. Design structure 990 may then proceed to a stage 995 where, for example, design structure 990: proceeds to tape-out, is released to manufacturing, is released to a mask house, is sent to another design house, is sent back to the customer, etc.

While shown and described herein as a design structure, method and system for powering on an IC, it is understood that the disclosure further provides various alternative embodiments. That is, the disclosure can take the form of an entirely hardware embodiment, an entirely software embodiment or an embodiment containing both hardware and software elements. In one embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to power on IC 100. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a tape, a rigid magnetic disk and an optical disk. Current examples of optical disks include compact disk-read only memory (CD-ROM), compact disk-read/write (CD-R/W) and DVD.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A design structure embodied in a machine readable medium for designing, manufacturing, or testing a design, the design structure comprising:
   a system of powering on an integrated circuit (IC), the system comprising:
      a plurality of regions in the IC, each region including functional logic, a temperature sensor, a heating element therefor and a predetermined temperature value therefore,
   a processing unit including:
      a comparator for comparing the temperature against a predetermined temperature value,
      a controller, which in the case that the temperature is below the predetermined temperature value, delays functional operation of the IC and controls heating of the region of the IC, and
      a monitor for monitoring the temperature in the region;
   wherein the controller, in the case that the temperature rises above the predetermined temperature value, ceases the heating and initiates functional operation of the IC; and
   wherein in the case that a particular region does not attain the predetermined temperature value after a set number of attempts, the controller controls heating of a previously unheated proximate region that is in close proximity to the particular region.

2. The design structure of claim 1, wherein the heating element includes at least one of the following: functional logic within the IC and a resistor within the IC.

3. The design structure of claim 1, wherein the predetermined temperature value is different for at least two regions.

4. The design structure of claim 1, wherein the processing unit interacts with each region.

5. The design structure of claim 1, wherein the controller initiates functional operation of the IC only in the case that each of the plurality of regions is at a temperature above the predetermined temperature value therefor.

6. The design structure of claim 1, wherein in the case that the particular region does not attain the predetermined temperature value after heating the proximate region, the controller increases the predetermined temperature value for the proximate region and repeats the heating of the proximate region.

7. The design structure of claim 1, wherein the proximate region includes a plurality of proximate regions.

8. The design structure of claim 1, wherein the temperature sensor is external of the IC, and wherein the predetermined temperature value is selected to compensate for a location of the temperature sensor.

9. The design structure of claim 1, wherein the monitor further monitors an operational temperature of the region after the initiating of functional operation of the IC, and in the case that the operational temperature is below a predetermined operational value, the controller controls heating of the region of the IC until the operational temperature rises above the predetermined operational value.

10. The design structure of claim 1, wherein the design structure comprises a netlist, which describes the integrated circuit.

11. The design structure of claim 1, wherein the design structure resides on storage medium as a data format used for exchange of layout data of integrated circuits.

12. The design structure of claim 1, wherein the design structure includes at least one of test data files, characterization data, verification data, or design specifications.

13. A design structure embodied in a machine readable medium for designing, manufacturing, or testing a design, the design structure comprising:
   a system of powering on an integrated circuit (IC), the system comprising:
      a plurality of regions in the IC, each region including functional logic, a temperature sensor for sensing a temperature in the region when the IC is powered up and a heating element therefor;
   a processing unit including:
      a comparator for comparing the temperature of each region against a respective predetermined temperature value therefor,
      a controller, which in the case that the temperature is below the predetermined temperature value for at least one region, delays functional operation of the IC and controls heating of the at least one region of the IC,
      a monitor for monitoring the temperature of each region that is below the predetermined temperature value; and
   wherein the controller, in the case that the temperature of each region rises above the predetermined temperature value therefor, ceases the heating and initiates functional operation of the IC; and
   wherein in the case that a particular region does not attain the predetermined temperature value after a set number of attempts, the controller controls heating of a previously unheated proximate region that is in close proximity to the particular region.

14. The design structure of claim 13, wherein the design structure comprises a netlist, which describes the integrated circuit.

15. The design structure of claim 13, wherein the design structure resides on storage medium as a data format used for exchange of layout data of integrated circuits.

16. The design structure of claim 13, wherein the design structure includes at least one of test data files, characterization data, verification data, or design specifications.

* * * * *